Nov. 6, 1962    F. A. KROHM    3,061,866
WINDSHIELD WIPER ARM STRUCTURE
Filed April 1, 1960
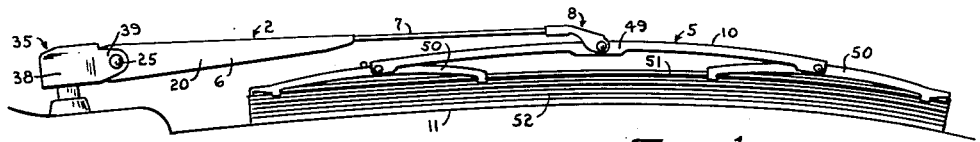
INVENTOR.
FRED A. KROHM
BY Charles S. Penfold
W. E. Recktenwald
ATTORNEY

United States Patent Office 3,061,866
Patented Nov. 6, 1962

3,061,866
WINDSHIELD WIPER ARM STRUCTURE
Fred A. Krohm, Hobart, Ind., assignor to The Anderson Company, a corporation of Indiana
Filed Apr. 1, 1960, Ser. No. 19,299
16 Claims. (Cl. 15—250.35)

This invention relates generally to windshield wiper equipment and more particularly is directed to improvements for operatively connecting sections of a wiper arm and the arm with a wiper blade assembly.

More specifically in this regard, an important object of the invention is to provide unique connection means for pivotally connecting an inner shaft-attaching section of a wiper arm with an outer spring-urged section which carries a wiper blade assembly.

The connection means embodying the subject invention is designed and constructed to stabilize the relative movement between the arm sections and thereby minimize wear and friction therebetween, as distinguished from certain conventional connections currently in use which merely utilize an elongate rivet having a shank which extends transversely through the sections and is upset at its free end at one side of the outer section and a head disposed at the other side of this section. The shanks of such rivets are usually relatively small in diameter, and after the wiper has been subjected to hard usage, the material defining the openings in the sections through which the shank extends wears away and enlarges the openings with the result that the connection between the sections ofttimes becomes so loose that the outer section is unable to maintain the wiper blade assembly at the correct wiping position while it is being oscillated on the windshield. Also, the upset end of a rivet is unsightly and does not harmonize with the head and in some instances the upsetting creates a binding action so that the outer blade-carrying section will not pivot freely relative to the inner section.

A significant object of the invention is to provide an improved connection means preferably comprising a tubular element which is journaled in an inner arm section and a pair of rivet members which are secured to the ends of the tubular element for supporting the outer arm section for pivotal movement relative to the inner section.

Another object of the invention is to provide a connection of the character above described in which the outer section is provided with tubular portions or trunnions through which the rivet members extend and a cap is pivotally mounted on the trunnions for covering or uncovering the inner section and particularly the shaft-receiving or attaching means carried by this section.

A further object of the invention is to provide an organization in which the tubular element is provided with enlarged cylindrical portions or trunnions which are journaled in walls of the inner section and the rivet members are secured in the ends of the element by distorting or expanding the element only at locations inset or between the trunnions. With this setup original shapes or diameters of the trunnions are maintained so they will freely pivot on the inner section.

Other attributes of the invention reside in providing a structure which offers advantages with respect to costs of manufacture, efficiency, and durability.

Additional objects and advantages of the invention will become apparent after the description hereinafter set forth is considered in conjunction with the drawings annexed hereto.

In the drawings:

FIGURE 1 is a side elevational view of a windshield wiper arm and a blade assembly embodying the invention or inventions;

FIGURE 2 is an enlarged partial elevational view of a windshield wiper arm as applied to a shaft;

FIGURE 3 is a vertical section taken substantially on the line 3—3 of FIGURE 2;

FIGURE 4 is an enlarged vertical section through portions of a windshield wiper arm and a blade assembly illustrating improved connection or pivot means therebetween;

FIGURE 5 is a horizontal section taken substantially on line 5—5 of FIGURE 4; and FIGURE 6 is an enlarged partial section showing the manner in which the components of one of the connection means are operatively associated with the arm sections.

Referring more particularly to the structure exemplified in FIGURES 1, 2, 3 and 6 of the drawing, numeral 1 generally designates an inner shaft-attaching section of a wiper arm, 2 an outer section, 3 connection means pivotally connecting the outer section to the inner section and resilient means 4 for urging the outer section and a blade assembly 5 carried thereby toward a windshield. The outer section is preferably comprised of an elongate channel 6 and an elongate bar 7 having an inner extremity secured in the channel and an outer extremity which carries a connector generally designated 8 and connection means generally designated 9 serving to pivotally connect the connector with a bridge 10 of a pressure device operatively attached to a blade unit 11 of the blade assembly.

The inner section of the wiper arm may be designed and constructed in various ways but as illustrated preferably includes an elongate planar base wall 12. One extremity of this wall is provided with a pair of corresponding parallel standards or walls 13 having openings or apertures 14 therein and the other extremity of the base wall is preferably provided with shaft-attaching or receiving means comprising an inverted cup 15 which in combination with the base wall forms a housing within which elements of a clutch means (not shown) are disposed for gripping a drive shaft 16 when a nut 17 on the cup is tightened. The base wall of the inner section and an end wall of the cup are provided with aligned apertures (not shown) so that the shaft can be extended through the housing and the clutch means.

The base wall 12 of the inner arm section is preferably provided with a hole 18 located between the standards 13 for detachably receiving a hooked end of a helical spring which constitutes the resilient means 4 above referred to. The other end of the spring is attached to the outer section at a desired location in a conventional manner. The base wall may also be provided with a clearance notch disposed in alignment with the hole 18 as depicted in FIGURE 2, so that the spring may properly swing relative to the inner section.

The channel 6 of the outer arm section preferably includes a top wall 19 and parallel side walls 20 provided with outwardly extending cylindrical tubular portions or protuberances 21 constituting trunnions or bearings adjacent the inner end of the channel. It will be noted that the diameters of the openings, apertures or holes in the protuberances are somewhat less than the diameters of the openings 14 in the standards 13 of the inner section. The top wall 19 is provided with a curved continuation 22 which is disposed between the standards 13 and the cup 15. This continuation may be caused to engage edges 23 of the standards for limiting upward pivotal movement of the outer arm section, when for example this section and blade assembly are manually lifted or moved away from the windshield when the latter is being cleaned by hand.

The connection means 3, above alluded to, for operatively connecting the arm sections will now be further described. This means, which may also be referred to as pivot means, is preferably constructed to include a tubular element 24 and a pair of corresponding headed elements or rivet members 25. The element 24 is preferably formed to provide enlarged cylindrical end portions 26 constituting trunnions journaled in the openings 14 in the standards and also on intermediate cylindrical portion 27 of a diameter slightly less than the diameter of the enlarged portions. The intermediate portion of the element has a longitudinal cylindrical bore or passage 28 which is counterbored or formed with recesses as indicated at 29 to provide tapered shoulders 30 at the junction between the passage and counterbores as clearly depicted in FIGURE 6. It will be noted that the axial length of each trunnion is greater than the thickness of each of the walls or standards 13 so that the inner portions of the trunnions are inset predetermined distances, preferably between and in spaced relation to the inner opposed planar surfaces of the standards 13 and that the shoulders 30 are similarly inset, the purpose of which will be presently described.

Each of the rivets include a relatively large head 31 constituting an abutment having an inner surface 32 and also a cylindrical shank 33 having a taper 34 at its free end. The diameter of the shank is less than the diameter of the holes defined by the protuberances 21 and the diameter of the recesses 29 but slightly greater than the diameter of the passage 28. The length of the tubular element is preferably such that its enlarged ends 26 project outwardly predetermined distances beyond the outer faces of the standards and engage the inner faces of the side walls 20 of the channel about the protuberances 21 to assist in firmly maintaining these side walls in a parallel relation.

To assemble the arm sections, the tubular element 24 is mounted in the openings 14 in the walls of the inner section, after which the sections are brought together so that the protuberances 21 of the side walls of the channel 6 are axially aligned with the passage 28 in the element, whereupon the rivets are forced into the ends of the element so that the tapers 34 on the rivet shanks engage the tapered shoulders 30 to slightly expand the intermediate portion 27 of the element to produce pressed fits or permanent connections between the rivets and element as shown in FIGURE 3. The expansion of the intermediate portion is localized between the inner portions of the trunnions 26 so that the trunnions will not become distorted or enlarged. In other words, with this unique setup the trunnions retain their original shape or configuration for free rotation in the openings 14 in the inner arm section.

The rivets are preferably driven home until their inner faces 32 engage the free ends of the protuberances 21 to cause the side walls 20 of the channel 6 to bear against the ends of the element so that the element, rivets and channel may be rotated as an assembly or unit relative to the standards or inner section of the arm. Since the ends of the tubular element extend beyond the outer faces of the standards, as alluded to above, the side walls of the channel are maintained in a predetermined spaced parallel relationship with relation to the standards in order to assist in reducing frictional engagement between the walls of the channel and the walls of the inner section so the latter may freely pivot while the blade unit of the blade assembly is oscillated on the windshield by the arm.

If desired, a cap generally designated 35 may be utilized to substantially cover or conceal the inner arm section and particularly the cup 15 and nut 17 of the means for attaching the arm to the shaft as best exemplified in FIGURES 1 and 2. The cap may be operatively associated with the arm in various ways but as shown it is preferably pivotally connected thereto.

The cup may be designated and constructed as desired but preferably includes a top wall 36, a curved end wall 37 and side walls 38 provided with parallel resiliently flexible continuations or ears 39 which extend forwardly beyond the top wall and are provided with apertures 40 through which the protuberances 21 project to pivotally connect the cap thereto for movement from a lower closed position in which the inner section is substantially concealed or to an elevated open position to afford access to the shaft-connection means on the inner section. Since the ears of the cap are resilient, they can be flexed so that the openings in the ears will accommodate the protuberances or trunnions 21. Otherwise expressed, the arrangement affords snap connections between the cap and channel part 6 of the arm. A marginal edge 41 of the top wall of the cap is adapted to engage the top wall of the channel 6 at a location forward of the axis of the connection or pivot means 3 to limit swinging movement of the cap to an open position away from shaft-attaching means and the top wall of the cap is adapted to engage the nut 17 for limiting the downward swing of the cap to its closed position concealing the inner section.

Attention is directed to the fact that the distance between the continuations or ears 39 of the cap is preferably slightly greater than the distance between the outer faces of the side walls 20 of the channel 6 and that when the rivets are secured to the tubular element the inner faces of the rivets are disposed in spaced relation to the outer faces of the ears, this being partly due to the length of the protuberances which project laterally from the ears. In other words, the ears are pivotally mounted on the protuberances between the heads of the rivets and side walls of the channel. The heads of the rivets are relatively large and constitute abutments which assist in stabilizing relative movement between the sections and cap.

With the above unique organization, the relative movement between the arm sections is well stabilized so that binding, friction and noise are materially reduced, as distinguished from certain conventional constructions wherein the pivotal connection means are of such a character that after the arm has been subjected to hard usage for a relatively short period or periods of time, the connection wears and becomes loose so that the outer arm section cannot correctly control the action of the blade unit to effectively wipe the windshield. In other words, a stable connection is required between the arm sections in order that the blade unit will properly perform its intended function. If, for example, there is what may be termed a "loose" fit between the arm sections, the blade unit will not rock efficiently relative to the arm when moved back and forth on the windshield.

It will be noted that due to the size of the heads of the rivets the connections between the cap and channel are substantially concealed from view. This enhances the general appearance of the arm as distinguished from a conventional connection in which the free end of a rivet shank is upset at one side of a channel.

Of further significance is the fact that the curved continuation 22 of the channel part 6 is so disposed between the ears of the cap and related to the top wall of the cap that when the outer arm section is in a normal position to direct the blade assembly on the windshield, the top wall and curved continuation complement one another to substantially avoid any gap appearing therebetween and thereby promote continuity between these components. In other words, the cap appears as a continuation of the outer arm section or as an inner section whereby the connection with the shaft does not appear to exist.

Referring now to the connector 8 and connection means 9 between this connector and the bridge 10 of the pressure device as exemplified in FIGURES 4 and 5, the connector is elongate having a channel extremity which receives the free end of the bar part 7 of the outer arm section and is interlocked therewith by indenting flanges 42 of the connector into an opening 43 provided in the part 7. The connector also includes a larger offset channel extremity having an inclined top wall 44 and side walls 45 provided with parallel continuations 46 extending forwardly beyond the top wall and having openings 47 therein.

The bridge 10 includes a top wall 48 and parallel side walls which are preferably widened as indicated at 49 in FIGURE 4. The opposite ends of the bridge are attached to yokes 50 and the ends of the yokes are operatively connected to a resiliently flexible support 51 for a wiping element 52 of the blade unit 11. The widened side walls of the bridge are provided with inturned tubular cylindrical portions or protuberances 53 providing aligned trunnions or bearings for rotatably supporting a cylindrical tubular element 54 which is of a length to locate its ends slightly beyond the outer faces or surfaces of the side walls of the bridge. A pair of headed elements or rivets are preferably employed to attach the connector to the element. The rivets have shanks 55 which extend through the apertures 47 in the side walls of the connector and are press-fitted into the ends of the element with heads 56 of the rivets engaging the outer planar surfaces of the continuations 46 of the connector. In other words, the side walls of the connector are clamped or firmly secured between the ends of the element and the heads of the rivets to permanently connect the arm-and-blade assembly for relative pivotal movement; and since the ends of the element extend beyond the side walls of the bridge, the side walls of the connector are maintained in spaced parallel relation to assist in reducing friction between these walls and the side walls of the bridge.

In view of the foregoing, it will be manifest that the unique connection means 3 and 9, respectively, operatively connecting the arm sections and the arm with the blade, offer over known connectional constructions, advantages with respect to efficiency, stability and durability.

Having thus described my invention, it is obvious that various modifications may be made in the same without departing from the spirit of the invention; and, therefore, I do not with to be understood as limiting myself to the exact forms, constructions, arrangements and combinations of parts herein shown and described.

I claim:

1. Windshield wiper structure comprising a first member having a pair of parallel walls provided with apertures, a second member having parallel walls provided with apertures, a cylindrical element extending only through the apertures in the first member, said element being provided with open ends, means secured in said open ends and extending through the apertures in the second member for pivotally connecting the members with the walls of the second member straddling the walls af the first member, said means being provided with abutments disposed exteriorly of and adjacent to the straddling walls for locking the element to said straddling walls.

2. Windshield wiper structure comprising a first member having a pair of substantially parallel walls provided with apertures, a second member having parallel walls provided with apertures smaller than the apertures in the first member, a cylindrical element extending only through the apertures in the first member and provided with open ends, and additional elements fixedly secured in said ends and extending through the apertures in the second member and secured therewith, said elements constituting means connecting the members together whereby relative pivotal movement is limited to the area between the cylindrical element and the first member.

3. A windshield wiper arm comprising an inner section having means for attaching the arm to a shaft and a portion provided with an aperture, an outer section having walls straddling the portion and provided with outturned tubular portions, and pivot means pivotally received through the aperture of the inner section and terminating adjacent the tubular portions of the outer section, and additional means extending axially from the pivot means through the tubular portions fixedly securing the pivot means to the outer section thereby limiting pivotal movement to the area between the pivot means and the aperture of the inner section.

4. A windshield wiper arm comprising an inner section having a pair of walls provided with apertures, an outer section having walls provided with openings positioned astride the walls of the inner section, a cylindrical element extending through the apertures and terminating short of the walls of the outer section, and means extending axially from the ends of the element and through the openings in the walls of the outer section for pivotally connecting the inner and outer sections.

5. A windshield wiper arm comprising an inner section having means for attaching the arm to a shaft and a pair of substantially parallel walls respectively provided with apertures, an outer section having substantially parallel walls straddling the walls of the inner section and respectively provided with apertures of a size somewhat smaller than the apertures in the inner section, a tubular element having enlarged end portions pivotally disposed in the apertures of the inner section, and a pair of means press-fitted in the outer ends of the element and extending through the apertures in the outer section to thereby retain the tubular element fixed with respect to the apertures in the outer section and pivotally connecting the sections.

6. A windshield wiper arm comprising an inner section having means for attaching the arm to a shaft and a portion provided with an aperture, an outer section having parallel walls straddling the portion and provided with tubular portions, means extending through the aperture and tubular portions for pivotally connecting the sections, and a cap mounted on said tubular portions for pivotal movement to an elevated position exposing said attaching means and to a lower position to substantially cover said attaching means.

7. A windshield wiper arm comprising an inner section provided with means for receiving a shaft and an aperture, an outer arm section for supporting a blade and having a pair of walls straddling the inner section and provided with outwardly extending tubular portions, pivot means extending through the aperture and tubular portions for pivotally connecting the sections and provided with abutments, and a cap having walls disposed between the walls of the outer section and the abutments and provided with apertures receiving the tubular portions for pivotally connecting the cap thereto for movement to a position covering the shaft-receiving means and to another position in which the latter means is uncovered to afford access thereto.

8. A windshield wiper arm comprising an inner section provided with means for receiving a shaft and a pair of parallel walls having apertures therein, an outer arm section for supporting a blade and having a pair of walls straddling the walls of the inner section and provided with outwardly extending tubular portions, a tubular element having enlarged cylindrical end portions journaled in the apertures, a pair of members respectively secured in the ends of the element and extending through the tubular portions for pivotally connecting the sections and having abutments engaging the ends of the tubular portions, and a cap having side walls disposed between the abutments and the walls of the outer section and provided with apertures through which the tubular portions extend to pivotally connect the cap thereto for movement to a position affording access to the shaft-receiving means and to a position covering the latter.

9. Connection means for use with windshield wiper structure, comprising a first member having a pair of parallel walls provided with transversely disposed tubular portions, a second member having a pair of parallel walls straddling the walls of the first member and provided with apertures aligned with the tubular portions, and pivot means comprising a tubular element extending through the tubular portions of the first member in pivotal relation therewith, and means at its ends extending through the apertures in the second member and fixedly connecting the second member to ends of the tubular element to thereby establish a pivotal connection between the tubular element and the tubular portion in the walls of the first member.

10. Means for connecting a windshield wiper arm unit and a blade unit, comprising a first member secured to one of the units and having a pair of parallel walls provided with inturned tubular portions, a second member secured to the other of the units and having a pair of apertured parallel walls straddling the walls of the first member, a tubular element extending through the tubular portions, and means carried by the ends of the tubular element extending through the apertures in the second member for respectively clamping the walls of the second member between the ends of said tubular element and means carried thereby so that the tubular element may pivot in the tubular portions upon relative movement between said members.

11. Windshield wiper structure comprising a first member having a pair of walls provided with aligned bearing openings therein, a second member having walls provided with aligned apertures, said second member positioned astride the first member with its apertures aligned with the openings of the first member, means pivotally received through the bearing openings of the first member with its opposite ends terminating adjacent the walls of the second member, and means fixedly received by the first-mentioned means and being fixedly secured to the second member thereby establishing a pivotal arrangement between the first and second members.

12. The structure of claim 11 wherein the apertures of the second member are smaller than the bearing openings of the first member.

13. Windshield wiper structure comprising a first member having a pair of substantially parallel walls provided with apertures, a second member having substantially parallel walls provided with apertures, said walls of the second member positioned astride the walls of the first member with the apertures being aligned, said apertures of the second member being smaller than the apertures of the first member, a tubular element having radially enlarged end bearing portions pivotally disposed in respective apertures of the first member and having end portions terminating adjacent the walls of the second member, said tubular element having a cylindrical bore therethrough counterbored at its ends, a pair of headed members having cylindrical shanks of a diameter less than that of the counterbores but slightly greater than that of the cylindrical bore so that when the shanks extending through apertures of the second member are press-fitted into the cylindrical bore from opposite directions, the material defining the tubular element will be expanded only between the radially enlarged end portions, said headed portions fixedly abutting the second member adjacent the apertures and securing the tubular member thereto in axial alignment therewith so as to establish a pivotal connection between the first and second members.

14. Connection means for establishing a pivotal connection between pivotable members comprising: a cylindrical element provided with a longitudinally extending bore extending substantially therethrough, said element having at each end external pivotal bearing surfaces and counterbores in the ends of the longitudinally extending bore, and a pair of headed members having cylindrical shanks adapted to be driven into the cylindrical bore from opposite ends thereof, said shanks being of a diameter less than the diameter of the counterbores but slightly greater than the cylindrical bore so that when the shanks are forced into holding contact with the cylindrical bore the diameter of the external pivotal bearing surfaces will remain unchanged, said headed members adapted upon being driven into the bore to fixedly secure one pivotable member with respect to the cylindrical element whereby the other pivotable member may be pivotally received on constant diameter bearing surfaces.

15. Connection means for establishing a pivotal connection between pivotable members comprising: a cylindrical element provided with spaced-apart bearing surfaces adjacent its ends and having a longitudinal bore extending therethrough, said bore provided with counterbores in each end thereof, a pair of headed members having a cylindrical shank adapted to be forced into the cylindrical bore from opposite ends thereof, said shank being of a diameter less than the diameter of the counterbore but slightly greater than the cylindrical bore so that when the shanks are forced into the cylindrical bore the diameter of the cylindrical element will be expanded intermediate its ends and the diameter of the spaced-apart bearing surfaces will remain constant to thereby pivotally receive a first member, said heads adapted to fixedly restrain a second member with respect to the cylindrical element to thereby establish a pivotal connection between the first and second members.

16. Windshield wiper structure comprising a pair of members, each of said members having a base wall and side walls with the side walls of one member straddling the side walls of the other member, said side walls being provided with aligned openings, the openings of the one member being smaller than the openings in the other member, means extending through the openings of the other member in pivotal bearing relation therewith and abutting the side walls of the one member adjacent the smaller openings, and means extending through the smaller openings and received by the first-mentioned means to fixedly retain the first-mentioned means with respect to the walls of the one member thereby establishing a pivotal connection between the first-mentioned means and other member.

References Cited in the file of this patent
UNITED STATES PATENTS

| | | |
|---|---|---|
| 2,154,012 | Rhodes | Apr. 11, 1939 |
| 2,844,839 | Krohm | July 29, 1958 |
| 2,850,755 | Deibel | Sept. 9, 1958 |

UNITED STATES PATENT OFFICE
CERTIFICATE OF CORRECTION

Patent No. 3,061,866 November 6, 1962

Fred A. Krohm

It is hereby certified that error appears in the above numbered patent requiring correction and that the said Letters Patent should read as corrected below.

Column 3, line 72, for "designated" read -- designed --; column 5, line 51, for "af" read -- of --; column 8, after line 58, insert the following 2,761,168    Krohm---------------Sept. 4, 1956

Signed and sealed this 7th day of January 1964.

(SEAL)
Attest:

ERNEST W. SWIDER
Attesting Officer

EDWIN L. REYNOLDS
Acting Commissioner of Patents